(12) United States Patent
Painter et al.

(10) Patent No.: US 10,582,695 B1
(45) Date of Patent: Mar. 10, 2020

(54) LIVESTOCK NURSING BOTTLE HANDLE

(71) Applicants: Mandi Painter, Panama, OK (US);
Carla Hope, Bokoshe, OK (US)

(72) Inventors: Mandi Painter, Panama, OK (US);
Carla Hope, Bokoshe, OK (US)

( * ) Notice: Subject to any disclaimer, the term of this patent is extended or adjusted under 35 U.S.C. 154(b) by 40 days.

(21) Appl. No.: 15/895,308

(22) Filed: Feb. 13, 2018

Related U.S. Application Data

(60) Provisional application No. 62/458,844, filed on Feb. 14, 2017.

(51) Int. Cl.
*A01K 9/00* (2006.01)
*B65D 23/10* (2006.01)

(52) U.S. Cl.
CPC .............. *A01K 9/00* (2013.01); *B65D 23/106* (2013.01)

(58) Field of Classification Search
CPC ....... A01K 9/00; B65D 23/106; B65D 23/104
USPC .......................................................... 215/396
See application file for complete search history.

(56) References Cited

U.S. PATENT DOCUMENTS

| D265,279 | S | * | 7/1982 | Wright ............................ 294/33 |
| 4,941,579 | A | * | 7/1990 | Lee ....................... A61J 9/0623 215/11.1 |
| D336,827 | S | * | 6/1993 | Knight .......................... D7/622 |

* cited by examiner

*Primary Examiner* — Andrew T Kirsch
*Assistant Examiner* — Don M Anderson
(74) *Attorney, Agent, or Firm* — I Head, Johnson, Kachigian & Wilkinson, PC

(57) ABSTRACT

A handle assembly for use with a livestock nursing bottle. The handle assembly may comprise a ring, which fits over the neck of the bottle, and two handles extending along the sides of the bottles. The handle assembly may further comprise arms extending from the handles to the front and back of the bottle, where the arms grip the bottle and help the user maintain control.

13 Claims, 2 Drawing Sheets

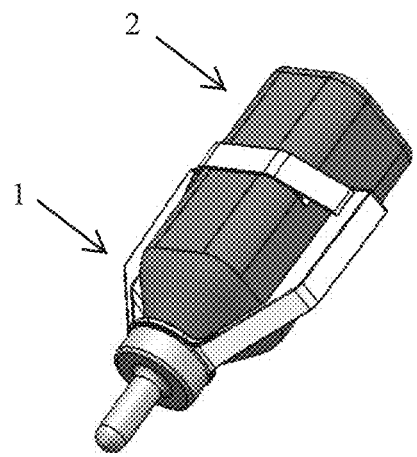
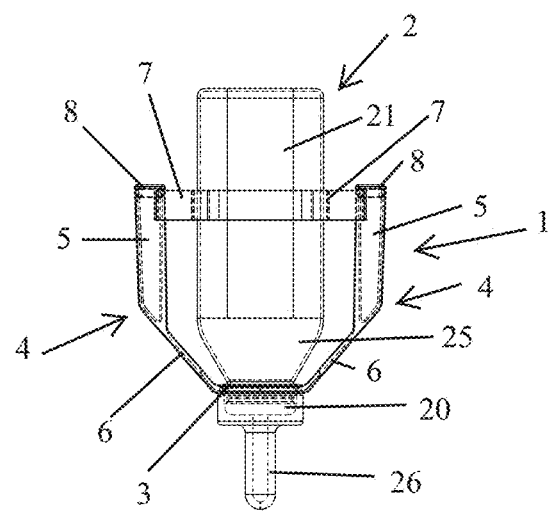
FIG. 1
FIG. 2
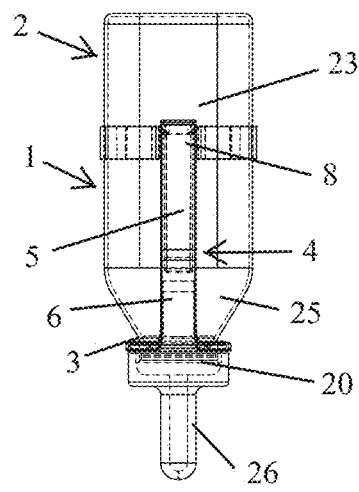
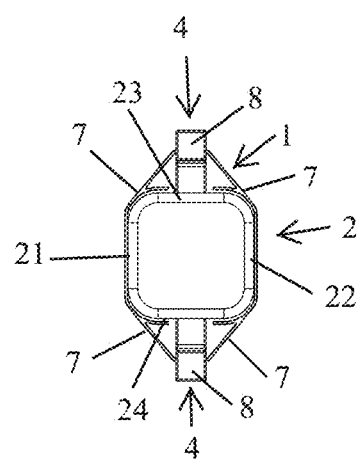
FIG. 3
FIG. 4

LIVESTOCK NURSING BOTTLE HANDLE

CROSS REFERENCE

This application is based on and claims priority to U.S. Patent No. 62/458,844 filed Feb. 14, 2017.

BACKGROUND OF THE INVENTION

Field of the Invention

This invention relates generally to tools for feeding livestock and more particularly, but not by way of limitation, to a handle to use with a bottle for nursing livestock.

Description of the Related Art

When livestock is orphaned or otherwise needs to be fed other than by its mother, such animal may be bottle fed by hand. Nursing bottles are typically made of glass or plastic and generally do not have handles. This can make trying to bottle feed an orphaned animal very difficult, especially as the livestock grows. The animal may tug the bottle and may lurch around while feeding, making it difficult for the person holding the bottle to keep their grip on the bottle, much less keep the bottle at a proper angle. This may be particularly true for children, the elderly, and those with limited strength or mobility.

Based on the foregoing, it is desirable to provide a handle that may be used in conjunction with a livestock nursing bottle.

It is further desirable for such handle to provide control of the nursing bottle, both to prevent dropping the bottle and to control the angle of the bottle.

It is further desirable for such handle to be easily attached to a variety of bottles.

SUMMARY OF THE INVENTION

In general, in a first aspect, the invention relates to a holder assembly comprising a ring, a pair of opposed handles projecting upwardly from the ring, and a pair of arms projecting from each of the handles.

Each of the pair of handles may comprise a grip section, where the grip section lies generally perpendicular to the ring, and a connecting section, where the connecting section connects the grip section to the ring and where the connecting section lies at an outward angle relative to the ring such that grip sections of the pair of handles lie at a distance greater than the ring's width. Each grip section may have a square cross section and may be hollow, and the holder assembly may further comprise a pair of plugs, where each plug is attached to a top of each grip section via friction fit. Each connecting section may be flat.

The arms may lie in a plane generally parallel to the ring. Each of the arms may initially project at an angle outwardly and toward the opposite handle, then bend such that each arm has a distal end lying in a plane parallel to a plane in which both handles lie.

The holder assembly may further comprise a bottle, where the bottle comprises a neck and a front face, a back face, and two opposed side faces. The ring may fit over the neck of the bottle, the handles may run along the two opposed side faces of the bottle, and each of the arms may lie against either the front face or the back face of the bottle. The pair of arms of each handle may be flexible and naturally lie closer together than the distance between the front face and the back face of the bottle, such that the pair of arms must flex for the bottle to fit within and the arms may grip the bottle. The bottle may be a livestock nursing bottle.

BRIEF DESCRIPTION OF THE DRAWINGS

FIG. 1 is a perspective view of the handle assembly in place on a livestock nursing bottle;

FIG. 2 is a front view of the handle assembly in place on a bottle;

FIG. 3 is a side view of the handle assembly in place on a bottle;

FIG. 4 is a too view of the handle assembly in place on a bottle;

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 5:
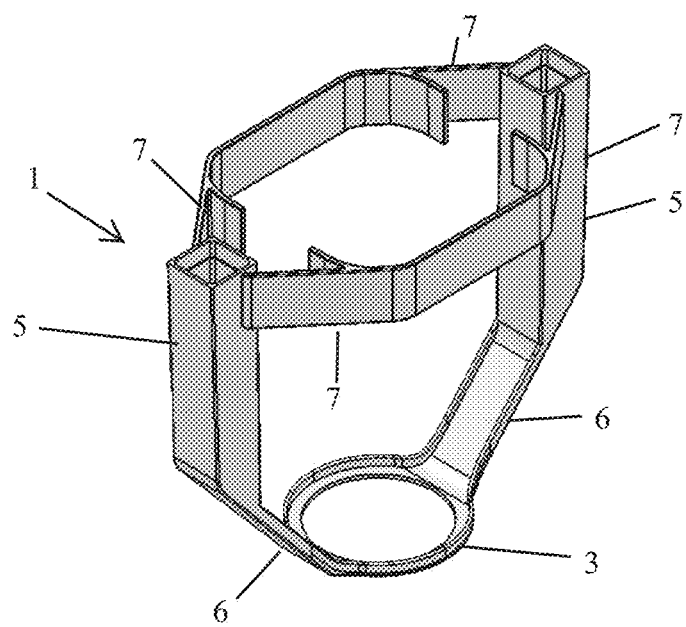
FIG. 5 is a perspective view of the handle assembly.
Figure 6:
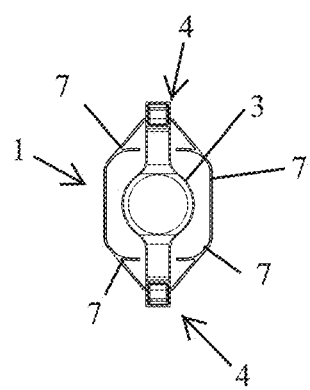
FIG. 6 is a bottom view of the handle assembly.
Figure 7:
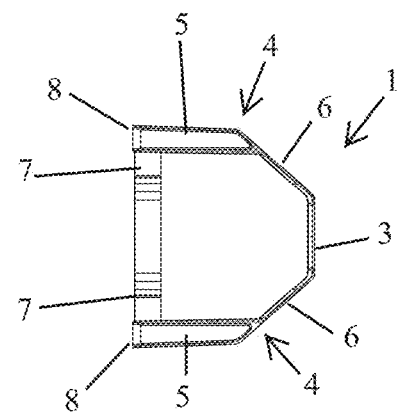
FIG. 7 is a cross sectional view of the handle assembly taken along line A.
Figure 8:
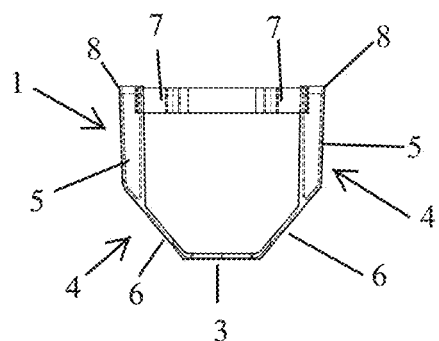
FIG. 8 is a front view of the handle assembly.
Figure 9:
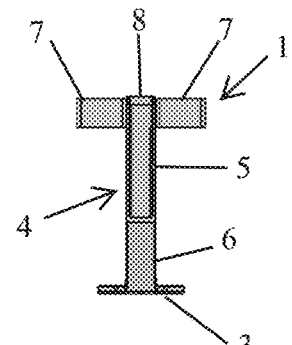
FIG. 9 is a cross sectional view of the handle assembly taken along line B.

In general, in a first aspect, the invention relates to a handle assembly 1 for use with a livestock nursing bottle 2. The handle assembly 1, seen in FIGS. 1 through 9, may comprise a ring 3 with a pair of opposed handles 4. The handles 4 may each have a grip section 5, which may connect to the ring 3 via a connecting section 6. The connecting sections 6 may angle upward and outward from the ring 3, while the grip sections 5 may upwardly project. The grip sections 5 may have any desired cross sectional shape. For example, the grip sections 5 may have a square cross section, as shown. Alternately, the cross section may be round; oval; triangular, pentagonal, hexagonal, or any other desired polygonal; or any combination of flat and or curved sides. Alternately, the grip sections 5 may be any other desired shape, such as flat. If the grip sections 5 are not flat, they may be hollow, as shown; they may be partially hollow and partially solid; or they may be entirely solid. If the grip sections 5 are hollow, they may terminate in a plug 8, as shown. The grip sections 5 may be straight, as shown, or may be curved, in whole or in part.

Similarly, the connecting sections 6 may be any desired shape. For example, the connection sections 6 may be flat, as shown. Alternately, the connecting sections 6 may have any desired cross sectional shape. The connecting sections 6 may be straight, as shown, or may be curved, in whole or in part.

A pair of opposed arms 7 may project at an inward angle from each of the handles 4. The arms 7 may lie in horizontal plane, generally perpendicular to the grip sections 5 and parallel to the ring 3, or may lie at any desired angle. The arms 7 may initially project at an outward angle from their respective handles 4, angled both outward and toward the opposite handle 4, and may include a bend such that their distal ends may run parallel to each other, as shown. The arms 7 of the two handles 4 may align with each other, but may not touch or connect. Alternately, the two arms 7 may connect and/or may be a single unbroken band, as shown. The arms 7 may be somewhat flexible, with a tendency to return to their original positions.

The handle assembly 1 may be made of plastic or any other desired material. The handle assembly 1 may be injection molded or may be made through any other desired method. All parts of the handle assembly 1 may be unitarily formed such that they are all integral parts of the whole. Alternately, any part or parts of the handle assembly 1 may be separately formed or made and may be joined to the other part or parts through any desired method or attachment device. For example, as shown, all parts of the handle assembly 1 may be integrally formed through injection molding except the plugs 8, which may be separately formed and attached to the grip sections 5 via friction fit.

The bottle 2, shown in FIGS. 1 through 4, may have a neck 20, a front face 21, a back face 22, and side faces 23 and 24. The bottle 2 may have a sloped section 25 connecting the neck 20 to faces 21, 22, 23, and 24, such that the neck 20 may have a smaller cross section that the rest of the bottle 2. The faces 21, 22, 23, and 24 may be flat, as shown, or curved and may be directly connected to each other or may connect via additional faces, such that the body of the bottle 2 may have a round cross section, a square cross section, an octagonal cross section, or any other desired shape of cross section. For example, the bottle 2 shown has flat faces 21, 22, 23, and 24 connected via curved faces, making the cross section of the bottle 2 a square with curved corners, as seen in FIG. 4. The bottle 2 may be a standard livestock nursing bottle, a custom livestock nursing bottle, or any other desired bottle. The bottle 2 may be included with the handle assembly 1 to form a handled bottle assembly, or the handle assembly 1 may be used with any existing bottle 2.

During use, the bottle 2 may be inserted neck 20 down into the handle assembly 1, such that the neck 20 passes through the ring 3 and the ring 3 rests against the sloped section 25. A lid or feeding nipple 26 may then be attached to the ring 3, holding the handle assembly 1 in place on the bottle 2. The handles 4 may be located on either side of the body of the bottle 2. The connecting sections 6 may correspond to the sloped section 25, while the grip sections 5 may correspond to the side faces 23 and 24. The slope of the connecting sections 6 may be the same as or greater than the slope of the sloped section 25, such that the grip sections 5 may be far enough apart that they do not touch the side faces 23 and 24. The arms 7 may be spaced such that they are closer together than the distance between the front face 21 and the back face 22 when the arms 7 are in their relaxed state. Thus, the arms 7 may be forced to flex for the handle assembly 1 to fit over the bottle 2. The arms 7 may therefore press against the front face 21 and the back face 22, allowing the handle assembly 1 to grip the bottle 2 and provide greater control to the user.

Whereas, the devices and methods have been described in relation to the drawings and claims, it should be understood that other and further modifications, apart from those shown or suggested herein, may be made within the spirit and scope of this invention.

What is claimed is:

1. A holder assembly comprising:
   a ring;
   a pair of opposed handles projecting upwardly from the ring, where each handle comprises:
      a grip section, where the grip section lies perpendicular to the ring, has a square cross section, and is hollow;
      a plug attached to a top of the grip section via friction fit; and
      a connecting section, where the connecting section connects the grip section to the ring and where the connecting section lies at an outward angle relative to the ring such that the distance between the grip sections of the pair of handles is greater than the ring's width; and
   two pairs of arms, where one pair of arms projects from each of the handles.

2. The holder assembly of claim 1 where each connecting section is flat.

3. The holder assembly of claim 1 where the arms lie in a plane parallel to the ring.

4. The holder assembly of claim 1 where the arms each initially project at an angle outwardly and toward the opposite handle, then bend such that each arm has a distal end lying in a plane parallel to a plane in which both handles lie.

5. The holder assembly of claim 1 further comprising a bottle, where the bottle comprises:
   a neck; and
   a front face, a back face, and two opposed side faces.

6. A holder assembly comprising:
   a ring;
   a pair of opposed handles projecting upwardly from the ring;
   two pairs of arms, where one pair of arms projects from each of the handles; and
   a bottle, where the bottle comprises:
      a neck; and
      a front face, a back face, and two opposed side faces;
   where the ring fits over the neck of the bottle, the handles run along the two opposed side faces of the bottle, and each of the arms lies against either the front face or the back face of the bottle.

7. The holder assembly of claim 6 where the pair of arms of each handle are flexible and naturally lie closer together than the distance between the front face and the back face of the bottle, such that the pair of arms must flex for the bottle to fit within and the arms grip the bottle.

8. The holder assembly of claim 5 where the bottle is a livestock nursing bottle.

9. The holder assembly of claim 6 where each of the pair of handles comprises:
   a grip section, where the grip section lies generally perpendicular to the ring; and
   a connecting section, where the connecting section connects the grip section to the ring and where the connecting section lies at an outward angle relative to the ring such that the distance between the grip sections of the pair of handles is greater than the ring's width.

10. The holder assembly of claim 9 where each connecting section is flat.

11. The holder assembly of claim 6 where the arms lie in a plane parallel to the ring.

12. The holder assembly of claim 6 where the arms each initially project at an angle outwardly and toward the opposite handle, then bend such that each arm has a distal end lying in a plane parallel to a plane in which both handles lie.

13. The holder assembly of claim 6 where the bottle is a livestock nursing bottle.

* * * * *